United States Patent
Lee et al.

(10) Patent No.: US 8,623,120 B2
(45) Date of Patent: Jan. 7, 2014

(54) APPARATUS AND METHOD FOR RECOVERY OF SULFUR HEXAFLUORIDE

(75) Inventors: Sang Hyup Lee, Gyeonggi-do (KR); Hyun Jung Lee, Seoul (KR); Joong Kee Lee, Seoul (KR); Joo Man Woo, Seoul (KR); Min Woo Lee, Seoul (KR); Han Byul Kim, Incheon (KR)

(73) Assignee: Korea Institute of Science and Technology, Seoul (KR)

(*) Notice: Subject to any disclaimer, the term of this patent is extended or adjusted under 35 U.S.C. 154(b) by 256 days.

(21) Appl. No.: 13/284,261

(22) Filed: Oct. 28, 2011

(65) Prior Publication Data

US 2012/0260799 A1  Oct. 18, 2012

(30) Foreign Application Priority Data

Apr. 15, 2011 (KR) .................. 10-2011-0034967

(51) Int. Cl.
*B01D 53/04* (2006.01)
*B01D 61/00* (2006.01)

(52) U.S. Cl.
USPC .......... 95/48; 95/49; 95/131; 95/135; 95/137; 95/9; 95/126; 95/132; 95/134

(58) Field of Classification Search
USPC ............... 95/14, 18, 43, 45, 48, 49, 117, 131, 95/135, 137, 148; 96/4, 9, 121, 126, 132, 96/134, 146; 423/240 S, 244.01
See application file for complete search history.

(56) References Cited

U.S. PATENT DOCUMENTS

| | | | |
|---|---|---|---|
| 5,298,229 A * | 3/1994 | Hardwick ................ | 423/210 |
| 5,720,797 A * | 2/1998 | Yates et al. ............. | 95/96 |
| 5,843,208 A * | 12/1998 | Anumakonda et al. .... | 95/47 |
| 5,855,647 A * | 1/1999 | Li et al. .................. | 95/45 |
| 6,096,114 A * | 8/2000 | Li et al. .................. | 95/47 |
| 6,454,837 B1 * | 9/2002 | Pittroff et al. ........... | 95/47 |
| 6,709,487 B1 * | 3/2004 | Dong et al. .............. | 95/117 |
| 6,723,153 B2 * | 4/2004 | Pittroff et al. ........... | 95/47 |
| 6,921,428 B2 * | 7/2005 | Yamamoto et al. ....... | 95/45 |
| 2010/0071559 A1 * | 3/2010 | Miachon et al. .......... | 96/113 |

* cited by examiner

Primary Examiner — Frank Lawrence, Jr.
(74) Attorney, Agent, or Firm — Ladas & Parry LLP

(57) ABSTRACT

An apparatus and a method for recovery of sulfur hexafluoride is provided. Sulfur hexafluoride ($SF_6$) may be separated with high-concentration and improved recovery ratio through a multi-stage separation and recovery processes using a plurality of separation membrane modules, and as well, $SF_6$ gas may be concentrated to maximize the $SF_6$ recovery ratio before the separation and recovery processes through the separation membrane modules. Furthermore, sulfur dioxide ($SO_2$) and moisture included in the $SF_6$ waste gas may be removed effectively so as to extend the service life of the separation membrane modules.

17 Claims, 2 Drawing Sheets

APPARATUS AND METHOD FOR RECOVERY OF SULFUR HEXAFLUORIDE

CROSS-REFERENCE TO RELATED APPLICATION

This application claims priority to Korean Patent Application No. 10-2011-0034967, filed on Apr. 15, 2011, and all the benefits accruing therefrom under 35 U.S.C. §119, the contents of which in its entirety are herein incorporated by reference.

BACKGROUND

1. Field

The present disclosure relates to an apparatus and method for recovery of sulfur hexafluoride.

2. Description of the Related Art

Sulfur hexafluoride ($SF_6$) is a typical electrical dielectric substance used for electric power devices. $SF_6$ is also used for washing process in the manufacture of semiconductor wafers, LCD panels, etc. $SF_6$, however, is known to have an impact on global warming about 23,900 times that of carbon dioxide. Further, in the Convention on Climate Change held in Kyoto in 1997, $SF_6$ was listed as one of six substances with the largest global warming potentials.

There are several methods for treating $SF_6$. The first method is to decompose $SF_6$. Since $SF_6$ is very stable, high energy such as plasma is required to decompose $SF_6$. Further, during the decomposition, highly toxic and corrosive byproducts such as $S_2F_{10}$, $SF_4$ and HF are produced. Considering the problems associated with the decomposition as well as the consistently increasing price of $SF_6$, it would be desirable to recover and recycle $SF_6$ in terms of cost saving.

In order to recover $SF_6$ from $SF_6$-containing mixture gas, general gas separation techniques such as chilling, pressure swing adsorption (PSA), membrane separation, etc. may be employed.

The chilling method is suitable for large-scale, high-concentration applications, but the investment cost is high while the energy consumption efficiency is low. In PSA method, an adsorbent such as zeolite is used to separate $SF_6$ by adsorbing small-sized molecules like nitrogen, and pressurization and decompression are repeated so that the adsorbed substance, e.g. nitrogen, is desorbed during decompression and then fresh nitrogen is adsorbed during the next pressurization, thereby separating $SF_6$ from a nitrogen/$SF_6$ mixture gas. In PSA method, however, $SF_6$ leaks out during desorption. Although the maximum recovery efficiency may be 90% or above, if the ratio of $SF_6$ in the mixture gas is low, liquefaction is necessary after separation, since only about 60 vol % of $SF_6$ is recovered from the mixture gas.

SUMMARY

In exemplary embodiments of this disclosure, sulfur hexafluoride ($SF_6$) may be separated with high-concentration and improved recovery ratio through a multi-stage separation and recovery processes using a plurality of separation membrane modules.

Also, in exemplary embodiments of this disclosure, $SF_6$ gas may be concentrated to maximize the $SF_6$ recovery ratio before the separation and recovery processes through the separation membrane modules. As well, sulfur dioxide ($SO_2$) and moisture included in the $SF_6$ waste gas may be removed effectively so as to extend the service life of the separation membrane modules.

In an exemplary embodiment, an apparatus for separating and recovering $SF_6$ may comprise: a gas pretreatment device removing sulfur dioxide ($SO_2$) and moisture included in an $SF_6$-containing waste gas; a first $SF_6$ concentrating device adsorbing $SF_6$ included in the waste gas with an adsorbent and desorbing $SF_6$ gas from the adsorbent; a first separation membrane module separating the waste gas exhausted from the first $SF_6$ concentrating device into a first recovered gas and a first remnant gas; a second separation membrane module separating the first recovered gas into a second recovered gas and a second remnant gas; a remnant gas storage tank storing the first remnant gas separated by the first separation membrane module; and a third separation membrane module receiving the first remnant gas from the remnant gas storage tank and separating the first remnant gas into $SF_6$ and the remaining gas. Herein, the first recovered gas and the second recovered gas respectively contain higher concentration of $SF_6$ than the first remnant gas and the second remnant gas.

The first $SF_6$ concentrating device may include a concentration chamber, an adsorbent provided in the concentration chamber and selectively adsorbing $SF_6$ included in the waste gas, and a heating devices selectively heating the concentration chamber so as to desorb the $SF_6$ adsorbed to the adsorbent.

The adsorbent may be an activated carbon, and the temperature of the concentration chamber may be controlled to about 50° C. to about 200° C. so as to desorb the $SF_6$ from the adsorbent.

The gas pretreatment device may include a first chamber and a second chamber placed adjacently and sequentially, a moisture removing material may be filled in the first chamber, an $SO_2$ removing material may be filled in the second chamber, and a heating device may be provided around the second chamber to control the temperature of the $SO_2$ removing material. The moisture removing material may be one of microparticulate zeolite, silica and molecular sieve, and the $SO_2$ removing material may be one of metal oxide (MO) and zeolite or a mixture thereof, wherein M may be a group II metal.

The first separation membrane module may be made of a material with a relatively higher permeability as compared to the second separation membrane module, and the second separation membrane module may be made of a material with a relatively higher $SF_6$ selectivity as compared to the first separation membrane module. The first separation membrane module may be made of polycarbonate.

Each of the first separation membrane module, the second separation membrane module, and the third separation membrane module may be provided in a thermostat. The thermostat may provide space for mounting the first, second and third separation membrane modules and maintain the temperature of the first, second and third separation membrane modules constant. The temperature of the thermostat may be controlled to about 20° C. to about 150° C.

A waste gas stabilizing tank may be further provided before the gas pretreatment device or between the gas pretreatment device and the first separation membrane module. The waste gas stabilizing tank may maintain the concentration of $SF_6$ in the waste gas constant. The concentration of $SF_6$ in the waste gas may be controlled through the temperature control of the waste gas stabilizing tank.

In an exemplary embodiment, a method for separating and recovering $SF_6$ may comprise: removing sulfur dioxide and moisture included in a $SF_6$-containing waste gas; adsorbing $SF_6$ gas included in the waste gas with an adsorbent; desorbing $SF_6$ gas from the adsorbent by heating, thereby obtaining concentrated $SF_6$ gas; separating the concentrated $SF_6$ gas into a $SF_6$-containing first recovered gas and a first remnant gas; storing the first remnant gas; separating the first recovered gas into a $SF_6$-containing second recovered gas and a second remnant gas, and separating the stored first remnant gas into $SF_6$ and a remaining gas.

In an exemplary embodiment, the adsorbent is an activated carbon, and the heating is performed at a temperature of about 50° C. to about 200° C.

In an exemplary embodiment, the moisture is first removed from the waste gas by using a moisture removing material and then sulfur dioxide is removed from the waste gas by using a sulfur dioxide removing material, and heat is provided to the sulfur dioxide removing material.

In an exemplary embodiment, the concentrated $SF_6$ gas or the $SF_6$-containing waste gas is stored in a tank, and the concentration of the concentrated $SF_6$ gas or the $SF_6$-containing waste gas is adjusted by changing the temperature of the tank before being subject to separation.

According to the embodiments, even when the ratio of $SF_6$ in the waste gas is low, the separation and recovery efficiency of $SF_6$ is maximized. Also, the use of the multiple separation membrane modules improves the $SF_6$ recovery ratio and the use of the gas pretreatment device enables the removal of sulfur dioxide and moisture included in the waste gas, which contribute the improvement of the service life of the separation membrane modules.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
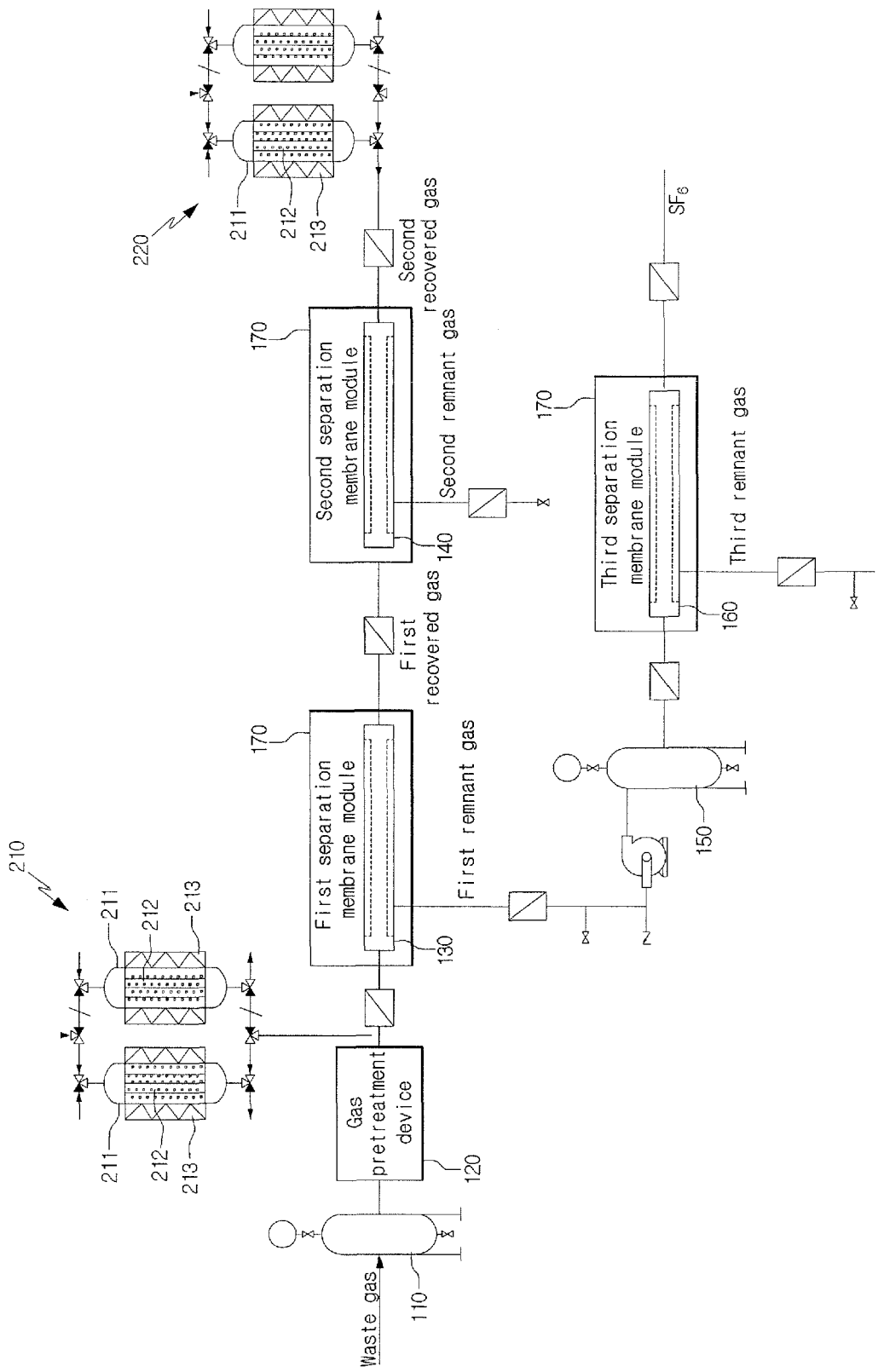
FIG. 1 is a schematic illustration of an apparatus for separating and recovering $SF_6$ according to an exemplary embodiment.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms a" "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Sulfur hexafluoride ($SF_6$)-containing waste gases are emitted from various emission sources. When the ratio of $SF_6$ in the waste gas is low, a high $SF_6$ recovery efficiency is not achieved with a commonly used apparatus for separating and recovering $SF_6$. The exemplary embodiments of this disclosure are applicable even when the waste gas contains $SF_6$ at low ratio. Improved $SF_6$ recovery efficiency may be provided by concentrating the $SF_6$ existing in the waste gas before separating and recovering the $SF_6$. In addition, in an exemplary embodiment, sulfur dioxide ($SO_2$) and moisture included in the waste gas may be removed before the concentrating of the $SF_6$ existing in the waste gas.

Referring to FIG. 1, an apparatus for separating and recovering $SF_6$ according to an exemplary embodiment may comprise a gas pretreatment device 120, a first $SF_6$ concentrating device 210, a first separation membrane module 130, a second separation membrane module 140, a second $SF_6$ concentrating device 210, a remnant gas storage tank 150 and a third separation membrane module 160. The gas pretreatment device 120 removes $SO_2$ and moisture included in the waste gas, the first $SF_6$ concentrating device 210 and the second $SF_6$ concentrating device 210 concentrates the $SF_6$ gas in the waste gas, and the first, second, and third separation membrane modules 130, 140, 160 recover the $SF_6$ included in the waste gas.

Figure 2:
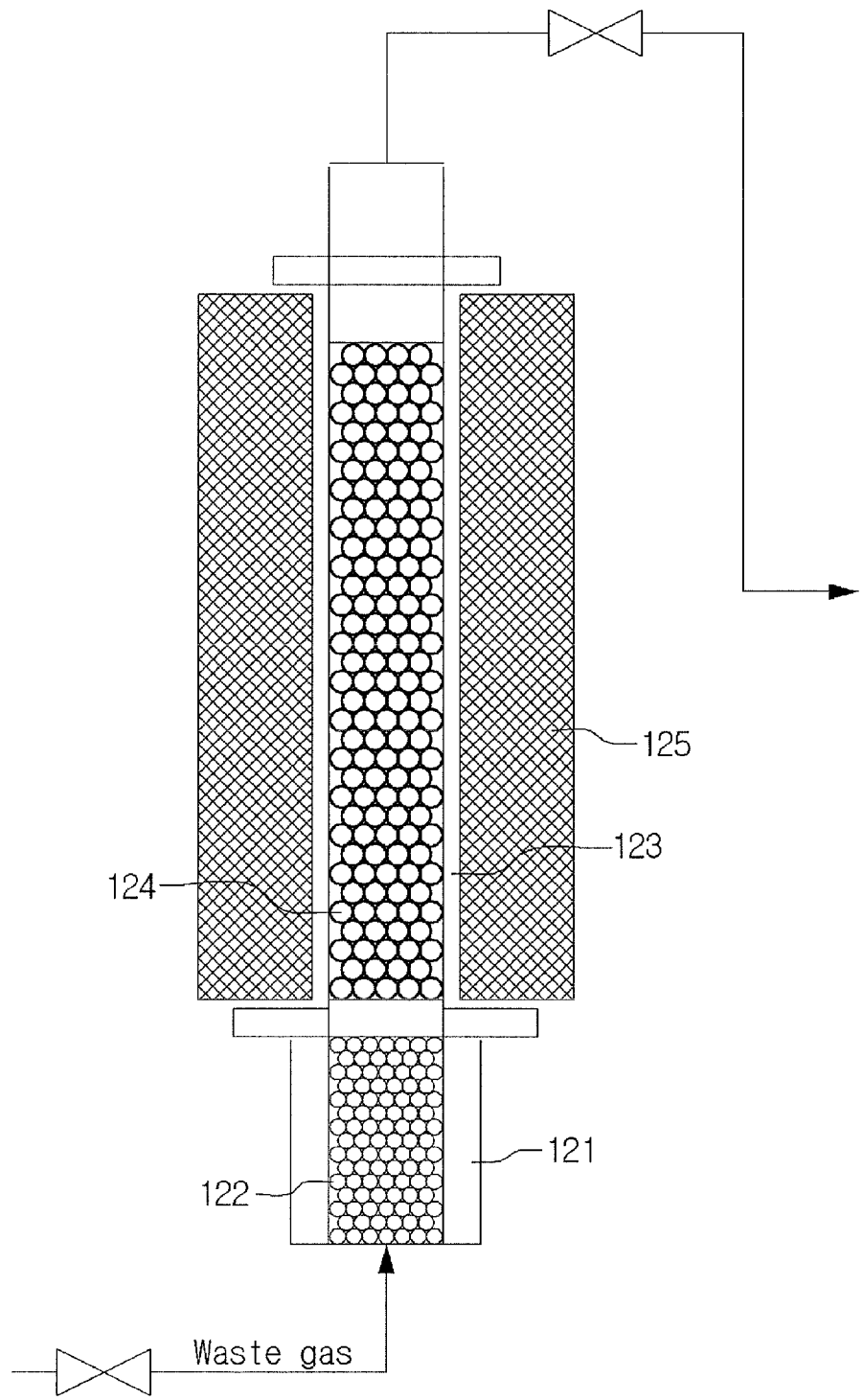
FIG. 2 is a schematic illustration of a gas pretreatment device according to an exemplary embodiment.

Explaining in detail, the gas pretreatment device 120 removes $SO_2$ and moisture included in the waste gas. The gas pretreatment device may comprise a first chamber 121, a second chamber 123 and a heating devices 125, as shown in FIG. 2. As used herein, the waste gas refers to a mixture gas of $SF_6$ with the other remaining gases. The other remaining gases may include $O_2$, $N_2$, $CO_2$, etc.

The first chamber 121 and the second chamber 123 are placed adjacently and sequentially. A moisture removing material 122 is provided in the first chamber 121, and an $SO_2$ removing material 124 is provided in the second chamber 123. The moisture removing material 122 may be zeolite, silica, molecular sieve, etc. having good hygroscopicity, which may be microparticulate. And, the $SO_2$ removing material 124 may be one of metal oxide (MO) and zeolite or a mixture thereof, having good $SO_2$ adsorption efficiency.

Herein, M may be a group II metal such as copper (Cu) (In this case, the metal oxide is CuO). For sequential removal, the moisture removing material 122 and the $SO_2$ removing material 124 may be respectively filled in the first chamber 121 and the second chamber 123, for example, in the form of microparticles. Meanwhile, the heating devices 125 may be provided around the second chamber 123 in order to improve $SO_2$ adsorption efficiency by the $SO_2$ removing material 124 in the second chamber 123. After passing the second chamber 123, the waste gas may be supplied to the first $SF_6$ concentrating device 210. Specifically, the temperature of the heating devices 125 may be controlled to about 100° C. to about 250° C.

The first $SF_6$ concentrating device 210 is provided between the gas pretreatment device 120 and the first separation membrane module 130, selectively adsorbs and desorbs the $SF_6$ gas included in the waste gas and, thus, selectively concentrates $SF_6$ only.

In more detail, the first $SF_6$ concentrating device 210 has a concentration chamber 211. An adsorbent 212 is provided in the concentration chamber 211. The adsorbent 212 selectively adsorbs the $SF_6$ gas included in the waste gas. The adsorbent 212 may be an activated carbon. Specifically, A1216 activated carbon, A836 activated carbon or A1261 activated carbon may be used. The concentration chamber 211 may be heated selectively by an external heating devices 213. When the concentration chamber 211 is heated, the $SF_6$ gas adsorbed to the adsorbent 212 may be desorbed and highly concentrated $SF_6$ gas with high purity may be supplied to the first separation membrane module 130.

The operation of the first $SF_6$ concentrating device 210 may be as follows. When the waste gas is supplied from the gas pretreatment device 120 to the first $SF_6$ concentrating device 210, the $SF_6$ in the waste gas may be adsorbed to the adsorbent 212 in the concentration chamber 211 and the remnant gas (e.g., $N_2$, $O_2$, etc.) excluding the $SF_6$ gas may be exhausted through an exhaust port (not shown) provided on one side of the concentration chamber 211. When the concentration chamber 211 is heated after the $SF_6$ is adsorbed to the adsorbent 212, the $SF_6$ adsorbed to the adsorbent 212 may be desorbed, and the desorbed $SF_6$ may be supplied to the first separation membrane module 130. The gas supplied to the first separation membrane module 130 may be a highly concentrated $SF_6$ gas with high purity. Specifically, when heating the concentration chamber 211 to desorb the $SF_6$, the heating temperature may be controlled to about 50° C. to about 200° C. When the heating temperature is below about 50° C., vapor may be condensed again in the concentration chamber 211, resulting in decreased amount of the desorbed $SF_6$. When the heating temperature is above about 200° C., the adsorbent 212 may be oxidized.

As such, the $SF_6$ separation and recovery efficiency may be maximized even when the waste gas contains a small amount of $SF_6$, since the $SF_6$ is concentrated by the first $SF_6$ concentrating device 210 and then supplied to the first separation membrane module 130.

The first separation membrane module 130 and the second separation membrane module 140 may be sequentially provided after the first $SF_6$ concentrating device 210 to recover the $SF_6$ included in the waste gas. A first preliminary recovery may be performed by the first separation membrane module 130 and a second recovery, which may be the final recovery, may be performed by the second separation membrane module 140.

Specifically, the first separation membrane module 130 separates the waste gas that has passed the first $SF_6$ concentrating device 210 into a first recovered gas and a first remnant gas. The first recovered gas refers to a gas containing $SF_6$ with higher concentration than the first remnant gas. The first remnant gas may contain a trace amount of $SF_6$. The second separation membrane module 140 separates the first recovered gas into a second recovered gas and a second remnant gas. The second recovered gas may be substantially $SF_6$ gas with high-concentration.

The first recovered gas containing $SF_6$ gas with low-concentration may be recovered primarily by the first separation membrane module 130, and the second recovered gas containing $SF_6$ with high-concentration may be recovered secondarily by the second separation membrane module 140. Accordingly, in order to improve $SF_6$ recovery efficiency, the first separation membrane module 130 may be made of a material with a relatively higher permeability as compared to the second separation membrane module 140, and the second separation membrane module 140 may be made of a material with a relatively higher $SF_6$ selectivity as compared to the first separation membrane module 130.

As used herein, "low-concentration" and "high-concentration" refer to the relative $SF_6$ concentration of the first recovered gas and the second recovered gas, the permeability refers to a permeability in the length direction of the separation membrane module, and "higher" $SF_6$ selectivity means that the recovered gas separated by each separation membrane module has higher $SF_6$ concentration. The first separation membrane module 130 may be made of polycarbonate (PC) having relatively superior permeability, and the second separation membrane module 140 may be made of polysulfone, polyimide, etc. having relatively superior $SF_6$ selectivity.

Each of the first separation membrane module 130, the second separation membrane module 140, and the third separation membrane module 160 may be provided in a thermostat 170. The thermostat 170 provides space for mounting the first, second and third separation membrane modules 130, 140, 160 and maintains the temperature of the first, second and third separation membrane modules 130, 140, 160 constant.

The gas constant (R) is variable depending on temperature. Since the change in the gas constant leads to change in the gas permeability of the first, second and third separation membrane modules 130, 140, 160, the temperature of the separation membrane modules should be maintained constant. Specifically, considering the efficiency of the separation membrane modules, the temperature of the thermostat 170 may be controlled to about 20° C. to ° about 150° C.

The remnant gas storage tank 150 stores the first remnant gas separated by the first separation membrane module 130 and supplies the first remnant gas to the third separation membrane module 160. The first remnant gas may be a remnant gas such as $O_2$, $N_2$, $CO_2$, etc. containing a trace amount of $SF_6$. Thus, separating the first remnant gas again into $SF_6$ and the remnant gas immediately may not allow good $SF_6$ separation efficiency. Accordingly, the first remnant gas separated by the first separation membrane module 130 may be stored until a certain amount of the first remnant gas is collected before the first remnant gas is separated into $SF_6$ and the remaining gas. The remnant gas storage tank 150 may serve the purpose.

The third separation membrane module 160 separates the first remnant gas stored in the remnant gas storage tank 150 into $SF_6$ and the remaining gas. The third separation membrane module 160 may be a final-stage separation membrane module like the second separation membrane module 140. Accordingly, the third separation membrane module may be made of a material with superior $SF_6$ selectivity. For example, it may be made of the same material as the second separation membrane module 140.

An apparatus for separating and recovering $SF_6$ according to an exemplary embodiment may further comprise a waste gas stabilizing tank 110. Since the concentration of $SF_6$ included in the waste gas is not constant, it may be necessary to maintain the $SF_6$ concentration of the waste gas constant. For this purpose, the waste gas stabilizing tank 110 may be provided to stabilize the waste gas. The waste gas stabilizing tank 110 may be provided before the gas pretreatment device 120 as illustrated in FIG. 1 or between the gas pretreatment device 120 and the first separation membrane module 130.

The reason why the $SF_6$ concentration in the waste gas needs to be maintained constant is for accurately determining the treatment efficiency of the first, second, third separation membrane module 160 and the $SF_6$ recovery ratio. The $SF_6$ concentration may be maintained constant by keeping the waste gas in the waste gas stabilizing tank 110 at constant temperature for a certain period of time.

Also, the $SF_6$ concentration in the waste gas may be controlled selectively by controlling the temperature of the waste gas stabilizing tank 110. For example, a temperature controller may be used to raise the temperature of the waste gas stabilizing tank 110 so as to decrease the $SF_6$ concentration, or conversely to lower the temperature so as to increase the $SF_6$ concentration.

Also, in an exemplary embodiment, a second $SF_6$ concentrating device 210 may be further provided after the second separation membrane module 140. The second $SF_6$ concentrating device 210 may be configured the same as the first $SF_6$ concentrating device 210. That is, The second $SF_6$ concentrating device 210 may comprise a concentration chamber 211, an adsorbent 212, and a heating devices 213. It may perform the same function as the first $SF_6$ concentrating device 210. That is, it may finally concentrate and separate the $SF_6$ discharged from the second separation membrane module 140.

In an exemplary embodiment, a method for separating and recovering $SF_6$ may include removing sulfur dioxide and moisture included in a $SF_6$-containing waste gas, adsorbing $SF_6$ gas included in the waste gas with an adsorbent, desorbing $SF_6$ gas from the adsorbent by heating, thereby obtaining concentrated $SF_6$ gas, separating the concentrated $SF_6$ gas into a $SF_6$-containing first recovered gas and a first remnant gas, storing the first remnant gas, separating the first recovered gas into a $SF_6$-containing second recovered gas and a second remnant gas, and separating the stored remnant gas into $SF_6$ and a remaining gas.

Further, in an exemplary embodiment, the adsorbent may be an activated carbon, and the heating may be performed at a temperature of about 50° C. to about 200° C.

In an exemplary embodiment, the moisture may be first removed from the waste gas by using a moisture removing material and then sulfur dioxide may be removed from the waste gas by using a sulfur dioxide removing material, and heat may be provided to the sulfur dioxide removing material.

In an exemplary embodiment, the concentrated $SF_6$ gas or the $SF_6$-containing waste gas may be stored in a tank (refer to the stabilization tank explained above), and the concentration of the concentrated $SF_6$ gas or the $SF_6$-containing waste gas may be adjusted by changing the temperature of the tank before being subject to separation.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. An apparatus for separating and recovering sulfur hexafluoride ($SF_6$), comprising:
    a gas pretreatment device removing sulfur dioxide ($SO_2$) and moisture included in an $SF_6$-containing waste gas;
    a first $SF_6$ concentrating device adsorbing $SF_6$ included in the waste gas with an adsorbent and desorbing $SF_6$ gas from the adsorbent;
    a first separation membrane module separating the waste gas exhausted from the first $SF_6$ concentrating device into a first recovered gas and a first remnant gas;
    a second separation membrane module separating the first recovered gas into a second recovered gas and a second remnant gas;
    a remnant gas storage tank storing the first remnant gas separated by the first separation membrane module; and
    a third separation membrane module receiving the first remnant gas from the remnant gas storage tank and separating the first remnant gas into $SF_6$ and the remaining gas,
    wherein the first recovered gas and the second recovered gas respectively contain higher concentration of $SF_6$ than the first remnant gas and the second remnant gas.

2. The apparatus according to claim 1, wherein the first $SF_6$ concentrating device comprises a concentration chamber, an adsorbent provided in the concentration chamber and adsorbing $SF_6$ included in the waste gas, and a heating device heating the concentration chamber so as to desorb the $SF_6$ adsorbed to the adsorbent.

3. The apparatus according to claim 2, wherein the adsorbent is activated carbon.

4. The apparatus according to claim 2, wherein the temperature of the concentration chamber is controlled to about 50° C. to about 200° C. so as to desorb the $SF_6$ from the adsorbent.

5. The apparatus according to claim 1, wherein the gas pretreatment device comprises a first chamber and a second chamber placed adjacently and sequentially, a moisture removing material is filled in the first chamber, an $SO_2$ removing material is filled in the second chamber, and a heating device is provided around the second chamber to control the temperature of the $SO_2$ removing material.

6. The apparatus according to claim 5, wherein the moisture removing material is selected from the group consisting of microparticulate zeolite, silica and molecular sieve.

7. The apparatus according to claim 5, wherein the $SO_2$ removing material is selected from the group consisting of metal oxide (MO), zeolite and a mixture thereof, and M is a group II metal.

8. The apparatus according to claim 1, wherein the first separation membrane module is made of a material with a relatively higher permeability as compared to the second separation membrane module, and the second separation membrane module is made of a material with a relatively higher $SF_6$ selectivity as compared to the first separation membrane module.

9. The apparatus according to claim 1, wherein the first separation membrane module is made of polycarbonate.

10. The apparatus according to claim 1, wherein each of the first separation membrane module, the second separation membrane module, and the third separation membrane module is provided in a thermostat.

11. The apparatus according to claim 10, wherein the thermostat provides space for mounting the first, second and third separation membrane modules and maintains the temperature of the first, second and third separation membrane modules constant, wherein the temperature of the thermostat is controlled to about 20° C. to about 150° C.

12. The apparatus according to claim 1, wherein a waste gas stabilizing tank is further provided before the gas pretreatment device or between the gas pretreatment device and the first separation membrane module, the waste gas stabilizing tank maintains the concentration of $SF_6$ in the waste gas constant, and the concentration of $SF_6$ in the waste gas is controlled through the temperature control of the waste gas stabilizing tank.

13. The apparatus according to claim 1, wherein a second $SF_6$ concentrating device is further provided after the second separation membrane module, and the second $SF_6$ concentrating device comprises a concentration chamber, an adsorbent provided in the concentration chamber and adsorbing $SF_6$, and a heating device heating the concentration chamber so as to desorb the $SF_6$ adsorbed to the adsorbent.

14. A method for separating and recovering $SF_6$ comprises:
removing sulfur dioxide and moisture included in a $SF_6$-containing waste gas;
adsorbing $SF_6$ gas included in the waste gas with an adsorbent;
desorbing $SF_6$ gas from the adsorbent by heating, thereby obtaining concentrated $SF_6$ gas;
separating the concentrated $SF_6$ gas into a $SF_6$-containing first recovered gas and a first remnant gas;
storing the first remnant gas;
separating the first recovered gas into a $SF_6$-containing second recovered gas and a second remnant gas; and
separating the stored first remnant gas into $SF_6$ and a remaining gas.

15. The method according to claim 14, wherein the adsorbent is an activated carbon, and the heating is performed at a temperature of about 50° C. to about 200° C.

16. The method according to claim 14, wherein the moisture is first removed from the waste gas by using a moisture removing material and then sulfur dioxide is removed from the waste gas by using a sulfur dioxide removing material, and heat is provided to the sulfur dioxide removing material.

17. The method according to claim 14, wherein the concentrated $SF_6$ gas or the $SF_6$-containing waste gas is stored in a tank, and the concentration of the concentrated $SF_6$ gas or the $SF_6$-containing waste gas is adjusted by changing the temperature of the tank before being subject to separation.

* * * * *